United States Patent
Vinogradov et al.

(10) Patent No.: US 8,991,707 B2
(45) Date of Patent: Mar. 31, 2015

(54) OPTICAL SLOT SCANNER HAVING COAXIAL ILLUMINATON

(75) Inventors: Igor Vinogradov, Oakdale, NY (US); Edward D. Barkan, Miller Place, NY (US); Mark E. Drzymala, St. James, NY (US); Yuly Mitelman, Stony Brook, NY (US); Eric S. Trongone, West Babylon, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 347 days.

(21) Appl. No.: 13/476,128

(22) Filed: May 21, 2012

(65) Prior Publication Data

US 2013/0306735 A1  Nov. 21, 2013

(51) Int. Cl.
*G06K 7/10* (2006.01)

(52) U.S. Cl.
CPC .... *G06K 7/10732* (2013.01); *G06K 2207/1018* (2013.01)
USPC ............. 235/462.41; 235/462.36; 235/462.43

(58) Field of Classification Search
USPC .............. 235/462.41, 462.43, 462.36, 462.37
See application file for complete search history.

(56) References Cited

U.S. PATENT DOCUMENTS

| 3,995,166 | A | 11/1976 | Hobart et al. |
| 4,591,236 | A | 5/1986 | Broockman et al. |
| 5,859,417 | A | 1/1999 | Dvorkis et al. |
| 6,360,949 | B1 | 3/2002 | Shepard et al. |
| 6,622,915 | B2 | 9/2003 | Ishikawa |
| 6,712,270 | B2 | 3/2004 | Leach |
| 7,533,819 | B2 | 5/2009 | Barkan et al. |
| 8,074,887 | B2 | 12/2011 | Havens et al. |
| 2006/0022051 | A1* | 2/2006 | Patel et al. ............... 235/462.14 |
| 2008/0023556 | A1 | 1/2008 | Vinogradov et al. |
| 2009/0001175 | A1 | 1/2009 | Goren et al. |
| 2010/0155478 | A1 | 6/2010 | Ogasawara et al. |
| 2010/0163622 | A1 | 7/2010 | Olmstead |
| 2011/0309147 | A1 | 12/2011 | Barkan et al. |
| 2013/0102379 | A1 | 4/2013 | Sargent et al. |
| 2013/0200158 | A1* | 8/2013 | Feng et al. ............... 235/462.36 |

FOREIGN PATENT DOCUMENTS

EP   0 325 469 B1   11/1995

OTHER PUBLICATIONS

International Search Report and Written Opinion for counterpart International Patent Application No. PCT/US2013/038241 mailed Nov. 27, 2013.

\* cited by examiner

*Primary Examiner* — Ahshik Kim
(74) *Attorney, Agent, or Firm* — Nong-Qiang Fan (57) ABSTRACT

An optical slot scanner (10) and method includes a housing (12) supporting a scanning arrangement (22) within an interior region (14) of the housing. The scanning arrangement (22) includes an imaging camera (26) and light source (24) disposed within a recess compartment (80) located in the interior region of the housing. The imaging camera defines an imaging field (40) of view for reading indicia located on a target object. The light source defines an illumination field (42) for illuminating indicia located on a target object, such that the illumination field is substantially coaxial with the imaging field during a reading of indicia located on a target object.

18 Claims, 8 Drawing Sheets

OPTICAL SLOT SCANNER HAVING COAXIAL ILLUMINATON

TECHNICAL FIELD

The present disclosure relates to an optical scanner and method of operation, and more specifically, an optical slot scanner having coaxial illumination.

BACKGROUND

Various electro-optical systems have been developed for reading optical indicia, such as barcodes. A barcode is a coded pattern of graphical indicia comprised of a series of bars and spaces of varying widths, the bars and spaces having differing light reflecting characteristics. The pattern of the bars and spaces encode information. Barcode may be one dimensional (e.g., UPC barcode) or two dimensional (e.g., DataMatrix barcode). Systems that read, that is, image or scan and decode barcodes employing imaging camera systems or laser scanner systems are typically referred to as optical scanners or barcode scanners.

Optical scanners may be portable or stationary. A portable optical scanner is one that is adapted to be held in a user's hand and moved with respect to target indicia, such as a target barcode, to be read that is, imaged or scanned and decoded.

SUMMARY

One example embodiment of the present disclosure includes an optical scanner comprising a housing supporting a scanning arrangement within an interior region of the housing. The scanning arrangement includes an imaging camera and light source disposed within a recess compartment located in the interior region of the housing. The imaging camera defines an imaging field of view for reading indicia located on a target object. The light source defines an illumination field for illuminating indicia located on a target object, wherein the illumination field substantially envelopes the entire imaging field of view as it passes through an exit window located in said housing into a scanning region during a reading of indicia located on a target object.

Another example embodiment of the present disclosure includes an optical slot scanner comprises a housing supporting a scanning arrangement, the housing defines an interior region of the optical slot scanner. The scanning arrangement comprises an imaging camera and light source disposed within the housing interior region. The imaging camera defines an imaging field of view for reading indicia located on a target object and the light source defines an illumination field for illuminating indicia located on a target object. The imaging field of view further defines a centrally located imaging optical axis throughout the imaging field of view and the illumination field further defines a centrally located illumination axis throughout the illumination field, the imaging camera and the light source being disposed such that the centrally located illumination axis is coaxially projected about the centrally located imaging optical axis.

A further example embodiment of the present disclosure includes a method of operating an optical slot scanner for imaging a target object. The method comprises the steps of supporting a scanning arrangement within an interior region of a housing, the scanning arrangement comprising an imaging camera and light source. The method further comprises defining an imaging field of view with the imaging camera for reading indicia located on a target object, the imaging field of view comprising a centrally located imaging optical axis. The method also comprises defining an illumination field with the light source for illuminating indicia located on a target object, the illumination field comprising a centrally located illumination axis. The method also includes disposing the imaging camera and the light source within the housing such that the centrally located illumination axis is coaxially located about the centrally located imaging axis.

Another example embodiment of the present disclosure comprises an optical slot scanner having a housing supporting a scanning arrangement. The housing defines an interior region of the optical slot scanner. The scanning arrangement comprises an imaging camera and light source disposed within the housing interior region. The imaging camera defining an imaging field of view for reading indicia located on a target object and the light source defining an illumination field for illuminating indicia located on a target object. The optical slot scanner further comprises an object detection sensor projecting an object sensor field of view with at least one object sensor light for detecting a target object within a scanning region such that upon detecting a target object, the light source and imaging camera are activated for imaging target indicia on a target object.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Referring now to the figures generally wherein like numbered features shown therein refer to like elements throughout unless otherwise noted. The present disclosure relates to an optical slot scanner and method of operation, and more specifically, an optical slot scanner having coaxial illumination.

Figure 1:
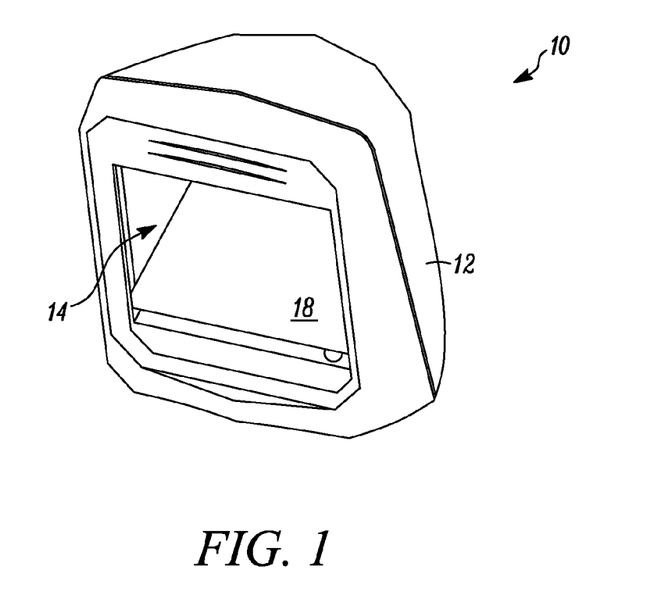
FIG. 1 is a front perspective view of an optical slot scanner constructed in accordance with one example embodiment of the present disclosure.

FIG. 1 is a front perspective view of an optical scanner 10 and specifically a optical slot scanner constructed in accordance with one example embodiment of the present disclosure. The optical slot scanner 10 in one example embodiment is built into a horizontal counter typically seen at a grocery store. The counter is often referred to as a check-out counter, and may include a cash register. The optical slot scanner 10 is used to check merchandise items bearing indicia relating to cost, such as barcodes.

The optical slot scanner 10 comprises a housing 12 formed from plastic defining an interior region 14 of the housing for supporting an imaging assembly 16. Positioned within the housing 12 is a transparent window 18 for projecting various optical fields 20 and capturing images from indicia positioned on target objects.

Indicia include for example, both one and two dimensional barcodes, signature codes, soft barcodes, datamatrix barcodes, UPC barcodes, and the like. Target objects such as consumer products typically include such indicia on the product or product's packaging and provides data (e.g. cost, type, and quantity) as the product, specifically indicia are read (imaged and decoded) by the scanner 10.

Figure 5:
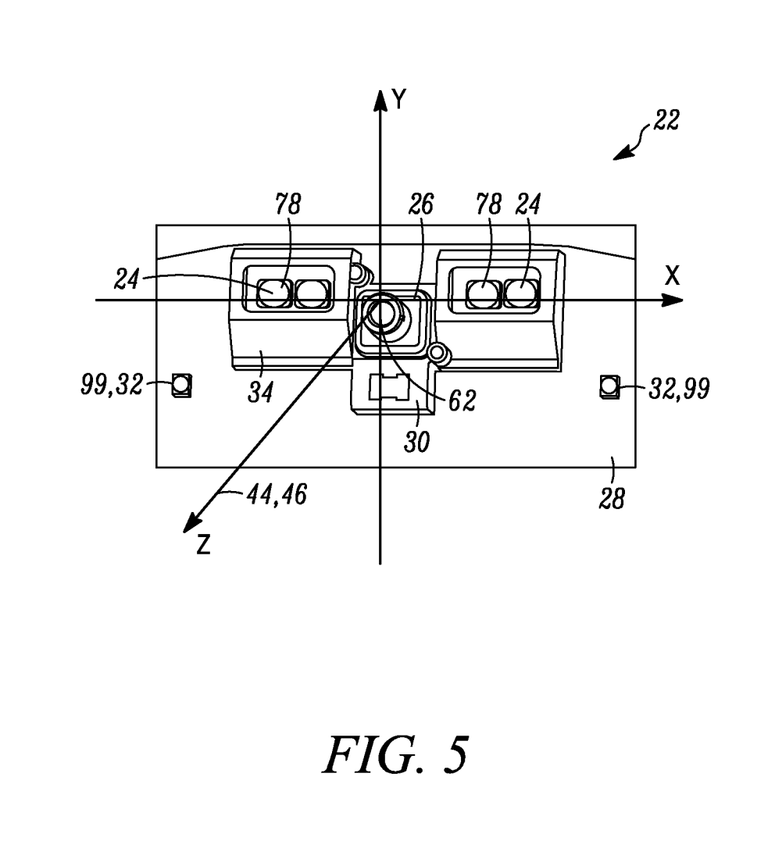
FIG. 5 is a board engine layout of an optical slot scanner constructed in accordance with another example embodiment of the present disclosure.

The imaging and decoding process executed by scanner 10 is achieved by a scanning arrangement 22 comprising a light source 24 and imaging camera 26 coupled to a printed circuit board (PCB) 28, as illustrated in the example embodiment of FIG. 5. The scanning arrangement in another example embodiment further comprises an object sensor 30, 92 and object sensor lights sources 32, 99.

Figure 11:
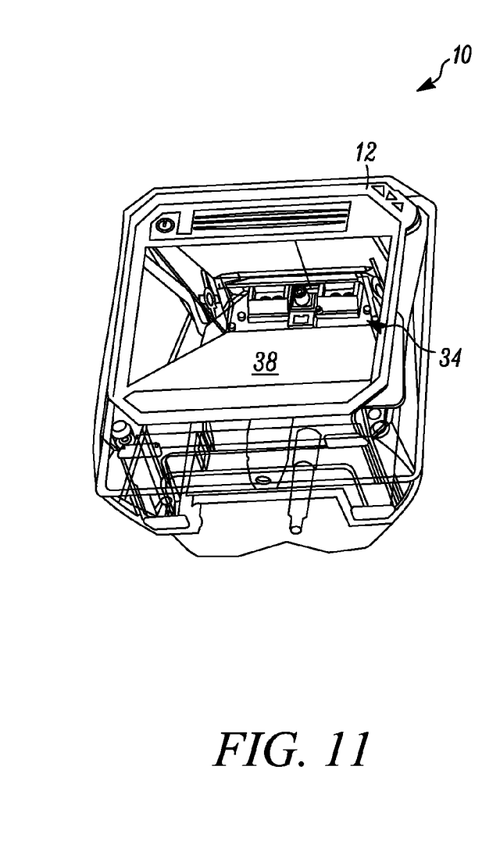
FIG. 11 is a front perspective view of an optical slot scanner constructed in accordance with another example embodiment of the present disclosure.

In the illustrated example embodiment of FIG. 5, the light source 24 comprises four LEDs fixed within an optical chassis 34. The positioning of the optical chassis 34 within the housing and on the PCB 28 is best seen in FIG. 11. It should be appreciated that the light source 24 can be other types of illumination devices such as cold cathode fluorescent lights (CCFL) without departing from the spirit and scope of the present disclosure. The housing 12 and optical chassis 34 in one example embodiment are constructed of plastic, but could be made from any other material of similar weight and/or strength.

Figure 3:
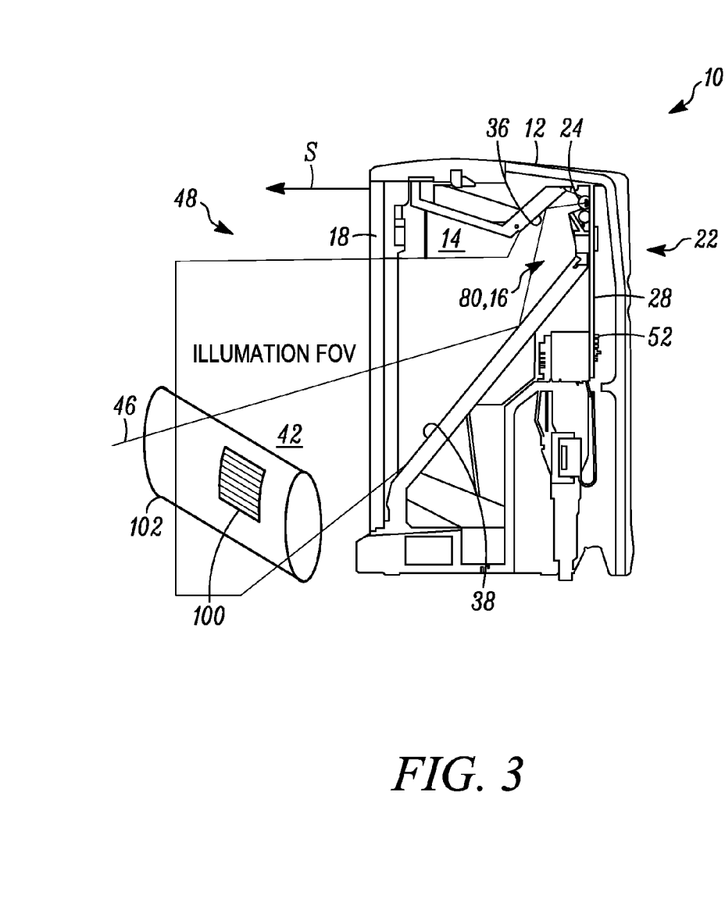
FIG. 3 is a medial cross sectional view of the optical scanner of FIG. 2 along section lines 3-3, illustrating an illumination field from a light source.
Figure 4:
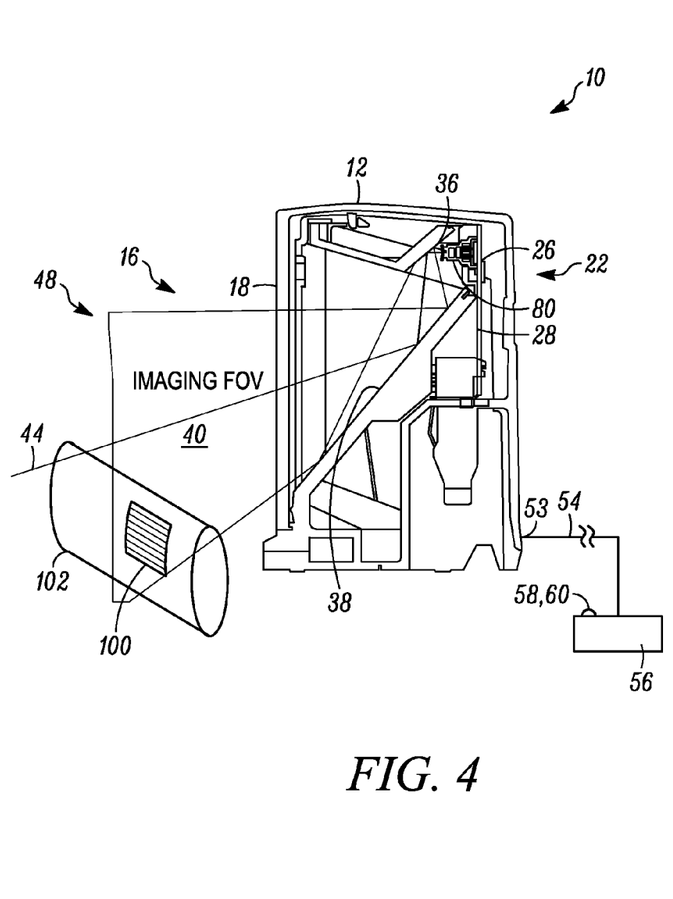
FIG. 4 is a medial cross sectional view of the optical slot scanner of FIG. 2 along section lines 4-4, illustrating an imaging field of view from a camera.

The imaging assembly 16, as best seen in FIGS. 3 and 4 further comprises first and second fold mirrors 36, 38, respectively for directing select field of views from the housing 12 toward a target object for imaging. The imaging camera 26 in the illustrated example embodiment comprises a charged coupled device (CCD), a complementary metal oxide semiconductor (CMOS), or other imaging pixel array type cameras. The imaging and decoding of the target object by camera 26 occurs by a process further explained in detail in U.S. patent application Ser. No. 12/816,711 entitled OPTICAL SCANNER WITH CUSTOMER INTERFACE that was filed on Jun. 16, 2010 with the United States Patent Office and published on Dec. 22, 2011 under U.S. Patent Application Publication Number US 2011/0309147. The above U.S. patent application Ser. No. 12/816,711 is incorporated by reference in its entirety.

In one example embodiment, the optical slot scanner 10, upon activation, projects substantially simultaneously an imaging field of view 40 (see FIG. 4) from the imaging camera 26 and an illumination field 42 (see FIG. 3) from the light source 24. If the target indicia 100 located on the target object 102 has sufficient illumination either ambient, from the target object (e.g. back lighting), or from the light source 24, and upon advancement of either the scanner or target object such that the target indicia is within imaging field of view 42, one or several images are successfully scanned/imaged, decoded, and read by the scanner 10, providing data relating to the target indicia.

In the illustrated example embodiment of FIG. 4, the imaging field of view 40 includes an imaging optical axis 44 symmetrically located therein. Like the imaging field of view 40, the imaging optical axis 44 is projected from the camera 26 and reflected from the first fold mirror 36, to a second fold mirror 38, and out from the housing 12 through transparent window 18 into a scanning region 48. The scanning region 48 is a location outside of the housing 16 that allows for a successful imaging, decoding, and reading of the target indicia 100.

In the illustrated example embodiment of FIG. 3, the illumination field 42 includes an illumination central axis 46 symmetrically located therein defined by a bundle of light projected from the light source 24 (such as a bundle of LEDs) and pointing in the same general direction as the light source generally along an axis. Like the illumination field 42, the illumination central axis 46 is projected from the camera 26 and reflected from the first fold mirror 36, to a second fold mirror 38, and out from the housing 12 through transparent window 18 into the scanning region 48.

In one example embodiment, the optical slot scanner 10 powers circuitry 50 (for imaging, decoding, and reading the target indicia 100) coupled to the PCB and powers the scanning arrangement 22 with a power supply 52, which can be either remote (e.g. battery and/or solar powered) or line powered. Once the imaging and decoding are successful, decoded data 54, representative of the data/information coded in the target indicia 100 is then output via a data output port 53 and/or displayed to a user of the optical slot scanner 10 via a display 56. Upon achieving a good read of the target indicia 100, that is, the target indicia was successfully imaged and decoded, a speaker 58 and/or an indicator LED 60 is activated by the circuitry 50 to indicate to the sales clerk that the target indicia has successfully read.

Figure 2:
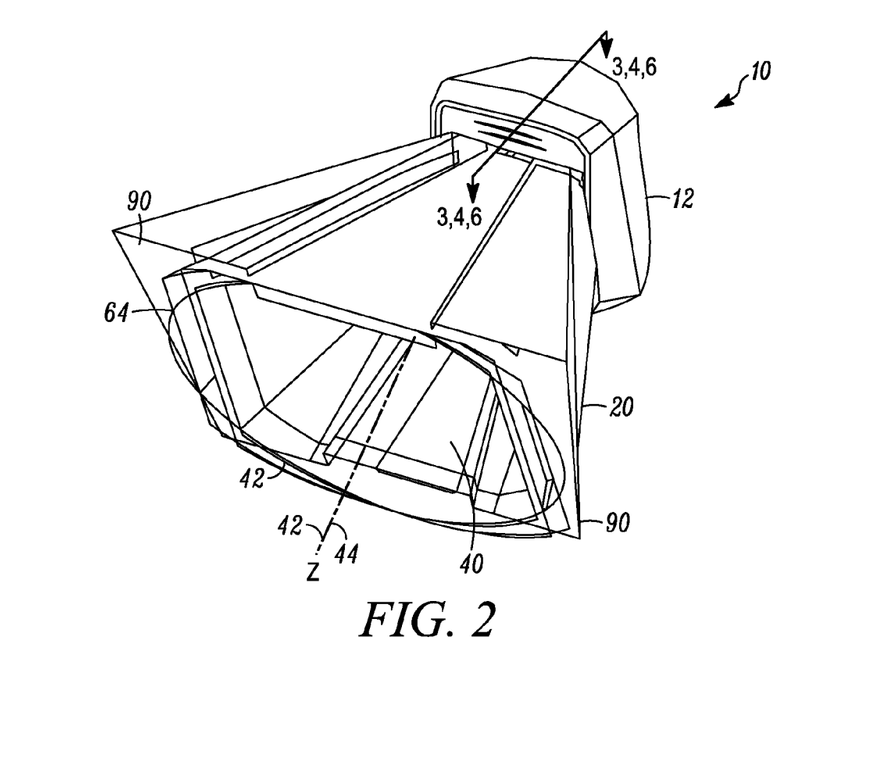
FIG. 2 is the perspective view of the optical slot scanner of FIG. 1, projecting multiple fields of view.

Referring again to scanning arrangement 22 of FIG. 5, the light source 24 is located in close adjacent proximity along an X axis with imaging camera 26. The light source 24 is also located in the example embodiment of FIG. 5 in close proximity along a Y axis with the imaging camera 26. Such that a lens 62 of the imaging camera 26 is designed in such a way that the imaging field of view (FOV) 40 is located within or enveloped by the illumination field 42 as illustrated in FIG. 2. In another example embodiment, illustrated in FIGS. 15 and 16, the imaging camera 26 and light source 24 are aligned on axis (X and Y axis), such that the imaging FOV optical axis 44 is coaxial and parallel with the illumination field central axis 46, as illustrated in FIG. 5. That is, the FOV optical axis 44 and the illumination field central axis 46 share the Z axis of FIG. 5.

Such construction of close adjacent proximity and on axis alignment of the light source 24 and imaging camera 26, advantageously allows for efficient illumination, wherein the illumination cone 64 (see FIG. 2) created by the illumination field 42 overlaps substantially with the imaging FOV 40. Thus, no energy is lost outside of the usable FOV 40 defined by the imaging optics 62 of the imaging camera 26, reducing the amount of energy and LEDs needed for sufficient illumination of a successful reading of the target indicia.

Such construction of close proximity and on axis alignment of the light source 24 and imaging camera 26 also advantageously eliminates any issues of specular reflection or "hot spots" which may occur within the imaging FOV. That is, the construction described and shown in the example embodiment of FIG. 5, produces no reflected light passing through the exit window 18 into the imaging FOV 40. Instead, all specular reflections are located outside the imaging FOV 42, which include a primary specular 70, a secondary specular 72, as shown in FIG. 6.

Figure 6:
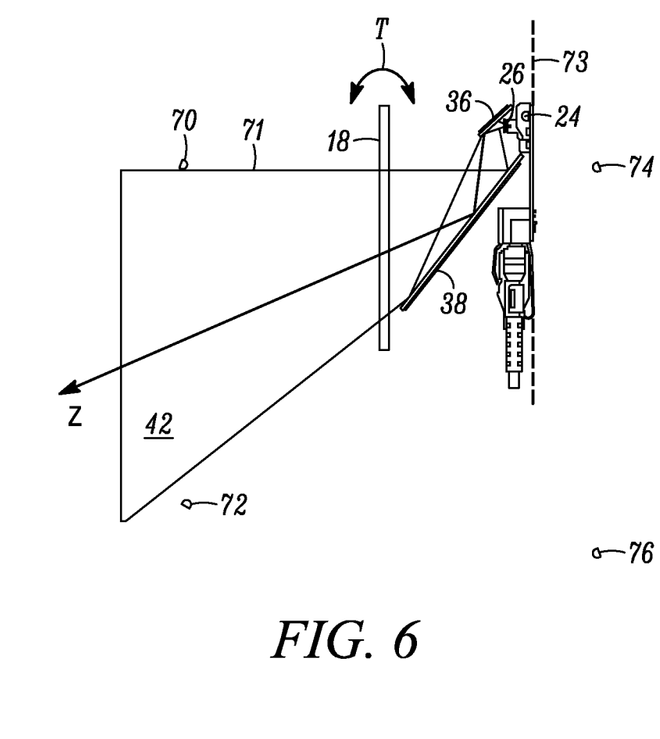
FIG. 6 is a medial cross sectional view of the optical slot scanner of FIG. 2 along section lines 6-6, illustrating orientations of specular reflections from a light source in accordance with one example embodiment of the present disclosure.
Figure 7:
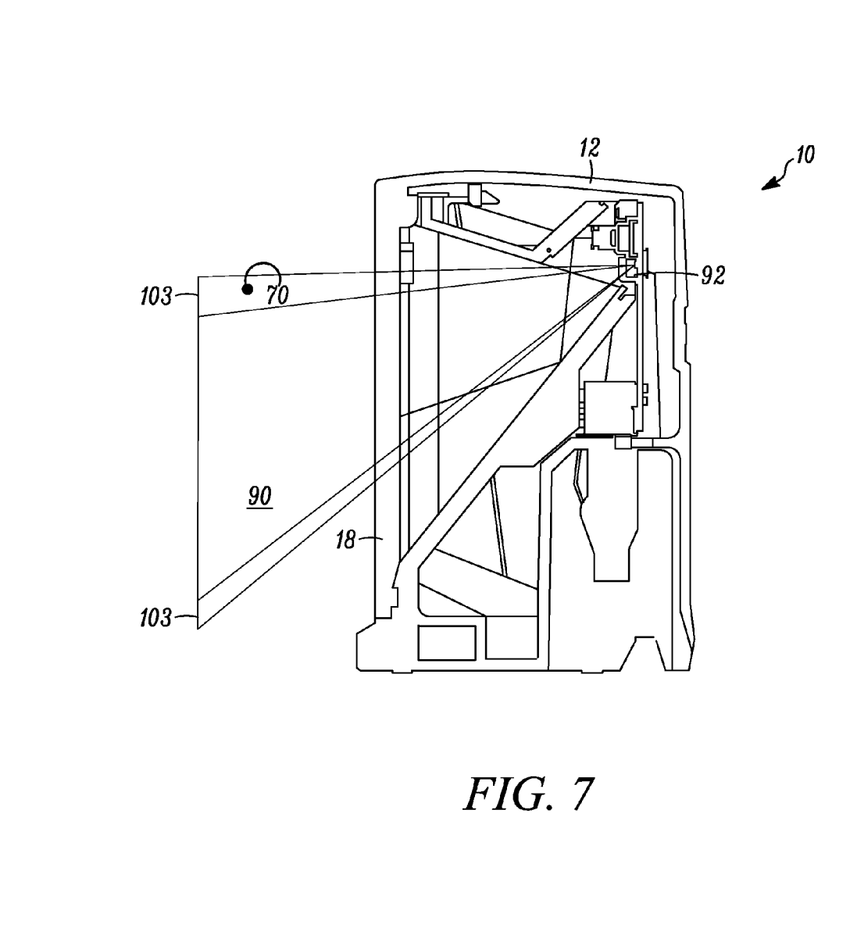
FIG. 7 is a medial cross sectional view of an optical slot scanner of FIG. 8 along section lines 7-7 in accordance with another example embodiment of the present disclosure.

Also as a result of the construction of the example embodiment of FIG. 5, a primary virtual source 74 is located below the actual location of the object and a secondary virtual source 76 is positioned behind the part, as shown in FIG. 6. Such elimination of hot spots not only provides more efficient illumination, but prevents irritation of the user's eyes and light pollution away from the target object, typically found in conventional slot scanners that usually position illumination around the peripheral zone of the scanner's exit window.

In the illustrated example embodiment of FIG. 6, the imaging FOV 40 comprises and defines a marginal imaging ray 71 at its outer periphery. The marginal imaging ray in FIG. 6 is substantially perpendicular with exit window 18 and an orientation plane 73 formed by the scanning arrangement 22.

In an alternative example embodiment, the specular reflection is contained outside of the imaging FOV 40, by tilting the exit window 18 in either direction shown by arrows T in FIG. 6, resulting in a transverse relationship with orientation plane 73. Such example embodiment, illumination lenses 78 over LEDs can be alternatively located slightly below the imaging optical axis. When the specular reflections are contained outside of the imaging FOV 40, enhanced images result during image the capturing process.

Another advantage of the illustrated example embodiment of FIGS. 3-6 is that the scanning arrangement 22, namely the light source 24 and imaging camera 26 are tightly positioned within a recessed compartment 80. That is, the recessed compartment 80 prevents any direct exposure of the user eyes by the scanner illumination 16 as indicated by the direction of arrow S in FIG. 3. Instead, the construction of the example embodiment concentrates the illumination FOV 42 around the imaging FOV 40 and is well hidden from direct viewing by the user.

Figure 8:
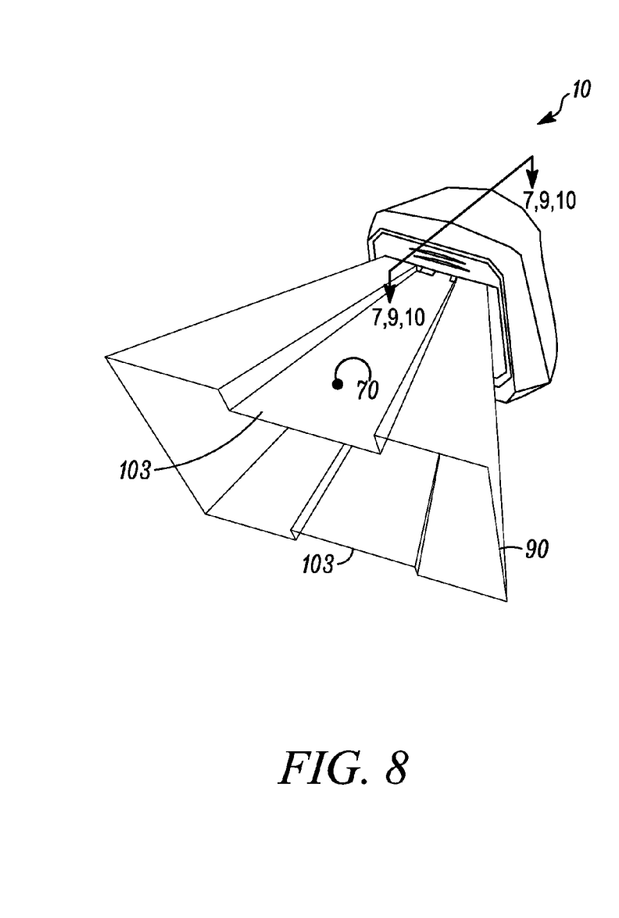
FIG. 8 is a front perspective view of an optical slot scanner constructed in accordance with another example embodiment of the present disclosure, projecting an object sensor field of view.

FIG. 8 is a front perspective view of a slot optical slot scanner 10 constructed in accordance with another example embodiment of the present disclosure. The optical slot scanner 10 in FIG. 8 projects an object sensor field of view 90 from an object sensor 92 in order to detect the presence of a target object 102 within the scanning region 48 to energize the illumination field of the imaging module.

The embodiment of FIG. 8 allows energy is be conserved or more efficiently used by only activating the illumination of the light source 24 when the presence or a target object 102 is detected in the scanning region 48 by the sensor 92. In one example embodiment, the scanning region terminates approximately four inches in front of the exit window within the imaging FOV 40.

Figure 9:
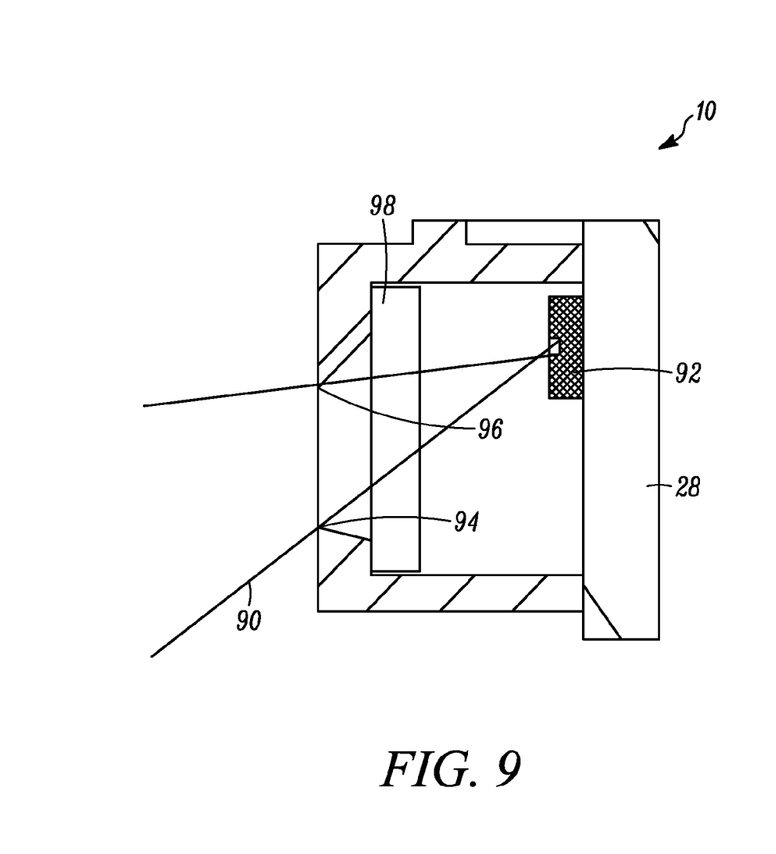
FIG. 9 is a medial cross sectional view of an optical slot scanner of FIG. 8 along section lines 9-9 in accordance with another example embodiment of the present disclosure, illustrating a detector field of view.
Figure 10:
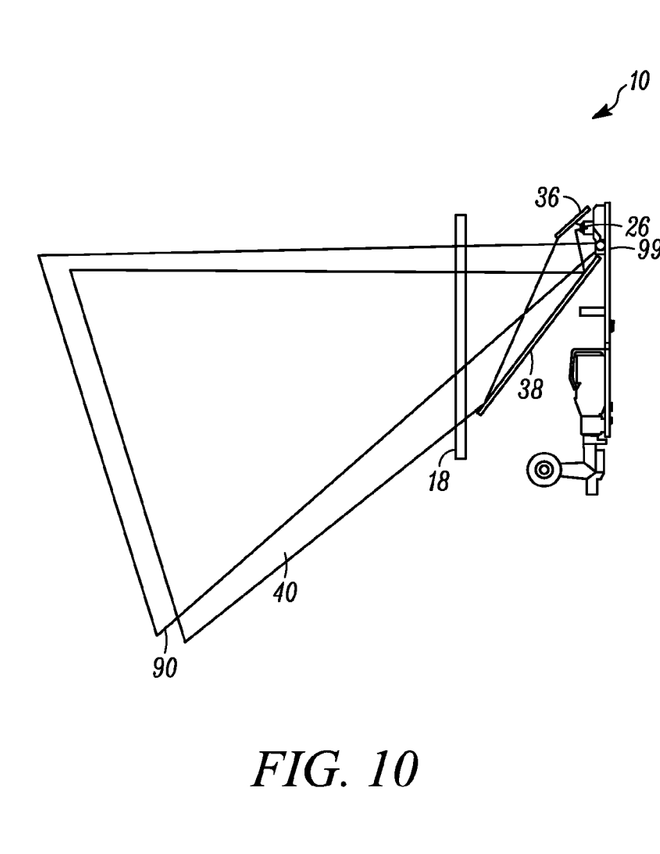
FIG. 10 is a partial assembly view of FIG. 9.

Used in combination with the object sensor 92 to detect a target object 102 is in one example embodiment an IR sensor 92, an aperture 93 defined by openings 94 and 96 in FIG. 9, a filter 98, and IR LEDs 99. The IR LEDs generate an invisible light to the human eye. And in the illustrated example embodiment, the sensor FOV 90 substantially overlaps with the imaging FOV 40. The aperture 93 in front of the sensor 92, limits the sensor to a desired size and advantageously is bent around primarly specular reflection 70 by troughs 103. The filter 98 minimizes the impact of the ambient light on the object sensor 92 performance and improves the signal to noise ratio of the object sensor system.

Figure 12:
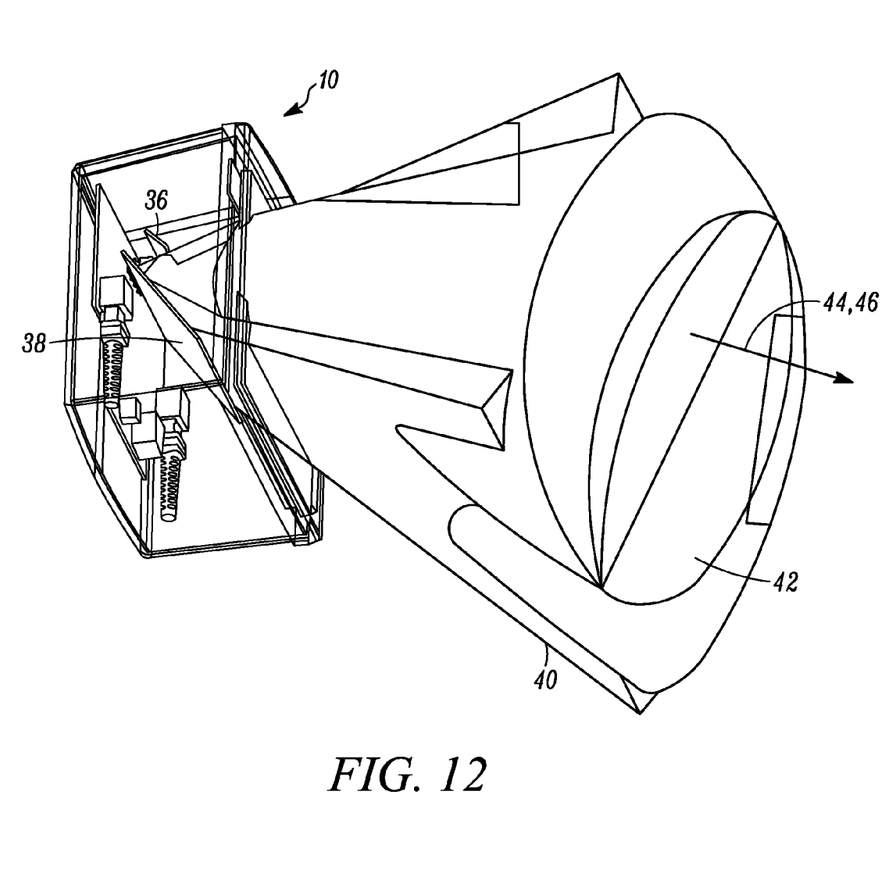
FIG. 12 is a bottom perspective view of an optical slot scanner constructed in accordance with another example embodiment of the present disclosure.
Figures 13, 14:
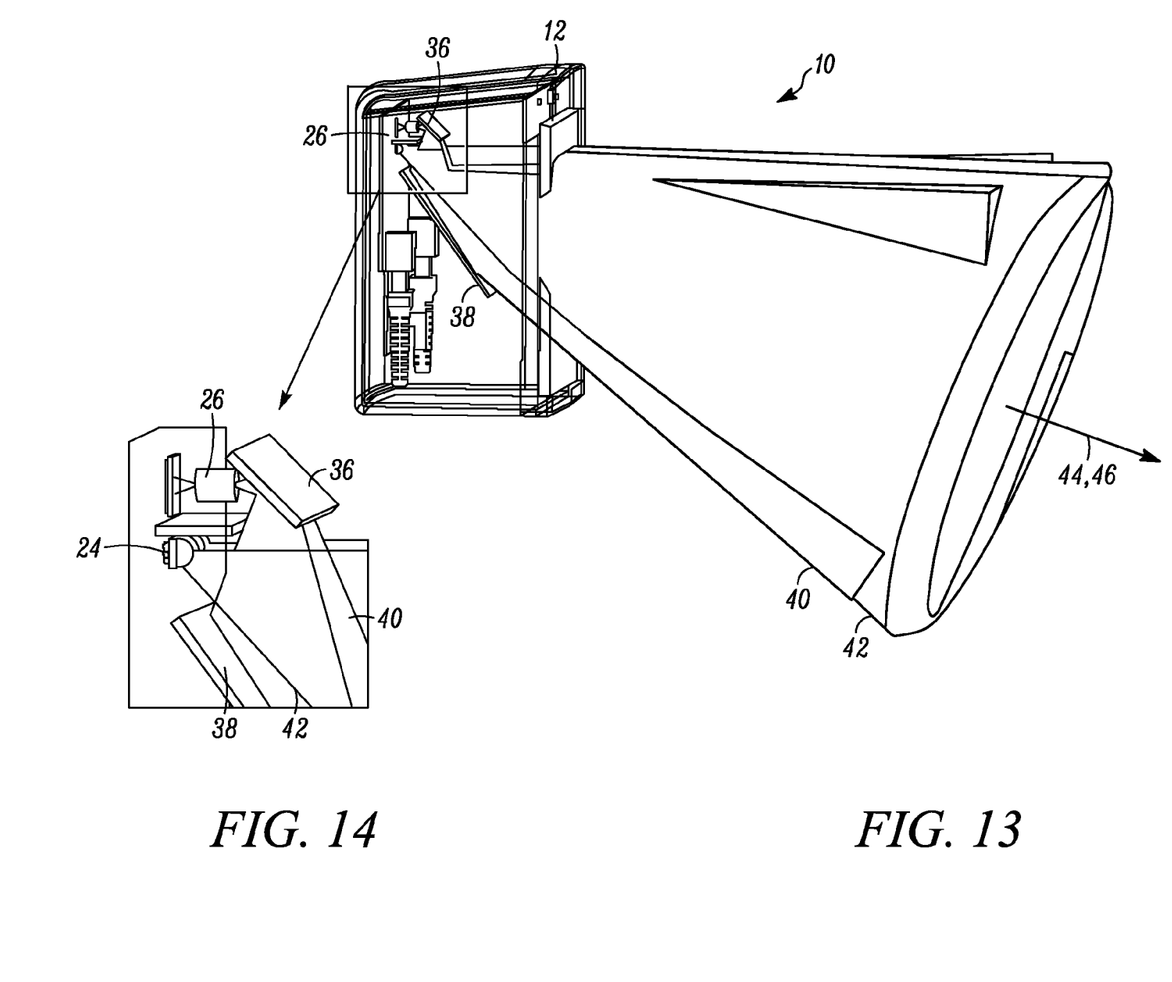
FIG. 13 is a side elevation view of the optical slot scanner in FIG. 12.
FIG. 14 is a magnified view of components located inside the optical slot scanner of FIG. 13.

Referring now to FIGS. 12-14 is a vertical optical slot scanner 10 constructed in accordance with another example embodiment of the present disclosure. In particular, the scanner 10 is constructed such that the light source 24 is located below and off axis of the imaging camera 26. The imaging camera 26 and light source 24 similarly provide their respective FOV, namely the imaging FOV 40 and illumination FOV 42 by projecting from the housing 12 via first and second folding mirrors 36, 38.

In the illustrated example embodiment of FIGS. 12-14, construction of the scanning arrangement 22 on the optical chassis 38 results in the illumination FOV 42 central axis 46 being nearly coaxial about the imaging FOV 40 optical axis 44. However, the relative construction also results in the imaging FOV 40 enveloping the illumination FOV 42.

Figure 15:
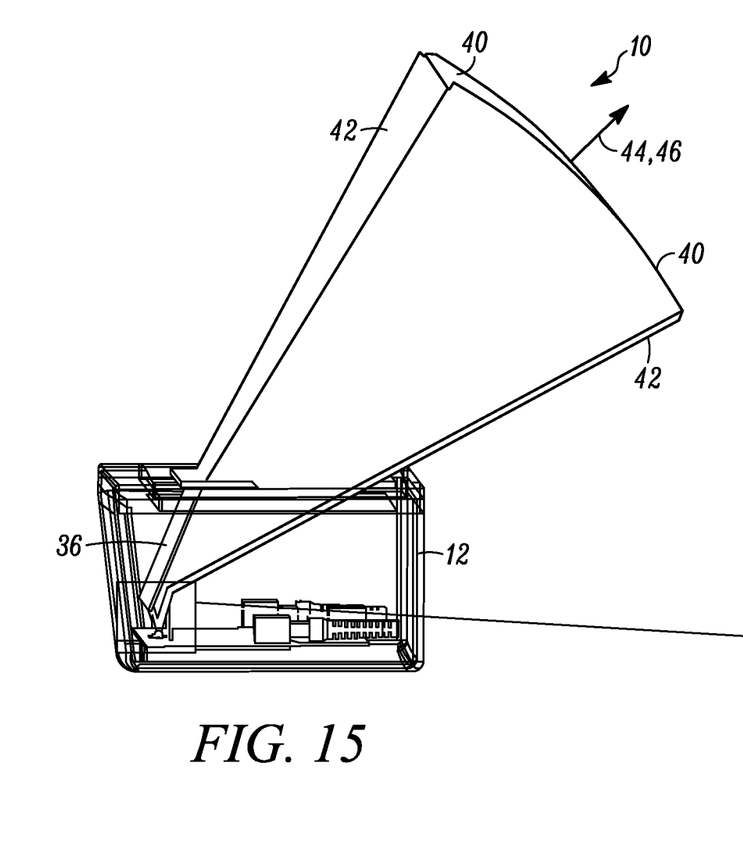
FIG. 15 is a front elevation view of an optical slot scanner constructed in accordance with another example embodiment of the present disclosure.
Figure 16:
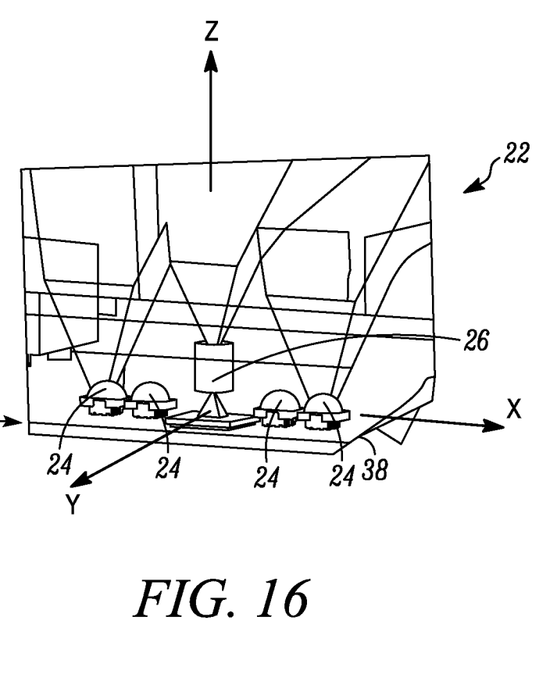
FIG. 16 is a magnified view of components located inside the optical slot scanner.

Referring now to FIGS. 15-16 is a horizontal optical slot scanner 10 constructed in accordance with another example embodiment of the present disclosure. In particular, the scanner 10 is constructed such that the light source 24 is located in line with the imaging camera 26. That is, both the imaging camera 26 and light source 24 are positioned symmetrically about the x and y axis of FIG. 16.

The imaging camera 26 and light source 24 similarly provide their respective FOV. That is, the imaging FOV 40 and illumination FOV 42 are projected from the housing 12 via a single fold mirror 36.

In the illustrated example embodiment of FIGS. 15-16, construction of the scanning arrangement 22 on the optical chassis 38 results in the illumination field 42 central axis 46 being concentric and nearly coaxial about the imaging FOV 40 optical axis 44. In addition, relative construction advantageously results in the illumination FOV 42 enveloping the imaging FOV 40.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An optical slot scanner comprising:
  a housing supporting a scanning arrangement within an interior region of the housing;
  the scanning arrangement comprising an imaging camera and light source disposed within a recess compartment located in the interior region of the housing;
  the imaging camera defining an imaging field of view for reading indicia located on a target object;

the light source defining an illumination field for illuminating indicia located on a target object, wherein said illumination field substantially envelopes the entire imaging field of view as it passes through an exit window located in said housing and into a scanning region during a reading of indicia located on a target object; and wherein said imaging field of view comprises a marginal imaging ray at an outer periphery of said imaging field of view and said scanning arrangement is oriented within said interior housing such that said marginal imaging ray is substantially perpendicular with said exit window such that specular reflections formed by said light source are outside of said imaging field of view.

2. The optical slot scanner of claim 1 wherein said imaging field of view defines a centrally located imaging optical axis throughout the imaging field of view and said illumination field defines a centrally located illumination axis throughout the illumination field, the optical slot scanner further comprising said scanning arrangement disposed such that said centrally located illumination axis is coaxially projected about said centrally located imaging axis.

3. The optical slot scanner of claim 1 wherein said illumination field is concentrically located about said imaging field of view optical axis.

4. The optical slot scanner of claim 1 wherein said recess compartment nests said light source such that said recess compartment eliminates passage of direct illumination from said exit window supported by said housing.

5. The optical slot scanner of claim 1 wherein said housing further comprises first and second fold mirrors located within said interior region for directing said illumination field and imaging field of view during operation.

6. The optical slot scanner of claim 1 further comprising a printed circuit board positioned within said interior region of said housing wherein said scanning arrangement is coupled to said circuit board.

7. The optical slot scanner of claim 6 wherein said imaging camera is disposed substantially adjacent with said light source along said printed circuit board.

8. The optical slot scanner of claim 6 wherein said light source is coupled to an object detection sensor for actuating said light source upon detecting a target object.

9. The optical slot scanner of claim 1 wherein said imaging field of view's marginal imaging ray is transverse to said exit window.

10. The optical slot scanner of claim 1 wherein said housing further comprises a single fold mirror located within said interior region for directing said illumination field and imaging field of view during operation, the imaging field of view being projected from one of a substantially horizontal or a substantially vertical plane.

11. The optical slot scanner of claim 1 further comprising:
an object detection sensor projecting an object sensor field of view with at least one object sensor light for detecting a target object within a scanning region such that upon detecting a target object, said light source and imaging camera are activated for imaging target indicia on a target object.

12. An optical slot scanner comprising:
a housing supporting a scanning arrangement within an interior region of the housing;
the scanning arrangement comprising an imaging camera and light source disposed within a recess compartment located in the interior region of the housing;
the imaging camera defining an imaging field of view for reading indicia located on a target object;
the light source defining an illumination field for illuminating indicia located on a target object, wherein said illumination field substantially envelopes the entire imaging field of view as it passes through an exit window located in said housing and into a scanning region during a reading of indicia located on a target object; and
wherein said exit window for passage of said imaging field of view and illumination field from said interior region of said housing is transversely oriented relative to an orientation plane formed by said scanning arrangement such that specular reflections formed by said light source are outside of said imaging field of view.

13. An optical slot scanner comprising:
a housing supporting a scanning arrangement, the housing defining an interior region of the optical slot scanner;
the scanning arrangement comprising an imaging camera and light source disposed within the housing interior region, the imaging camera defining an imaging field of view for reading indicia located on a target object and the light source defining an illumination field for illuminating indicia located on a target object;
the imaging field of view further defining a centrally located imaging optical axis throughout the imaging field of view and said illumination field further defining a centrally located illumination axis throughout the illumination field, said imaging camera and said light source being disposed such that said centrally located illumination axis is coaxially projected about said centrally located imaging axis and
an exit window for passage of said imaging and illumination field from said housing, said imaging field of view comprising a marginal imaging ray being at an outer periphery of said imaging field of view; and said scanning arrangement being oriented within said interior housing such that said marginal imaging ray is substantially perpendicular with said exit window such that specular reflections formed by said light source are outside of said imaging field of view.

14. The optical slot scanner of claim 13 wherein housing further comprising a recessed compartment for nesting said light source such that said recessed compartment eliminates passage of direct illumination from an exit window supported by said housing.

15. The optical slot scanner of claim 13 wherein said housing further comprises first and second fold mirrors located within said interior region of said housing for directing said illumination field and imaging field of view during operation.

16. The optical slot scanner of claim 13 further comprising a printed circuit board positioned within said interior region of said housing wherein said scanning arrangement is coupled to said circuit board.

17. The optical slot scanner of claim 16 wherein said imaging camera is disposed substantially adjacent with said light source along said printed circuit board.

18. The optical slot scanner of claim 13 wherein said imaging field of view further comprises a central axis that is transverse to said exit window and marginal ray.

* * * * *